May 14, 1940.                J. WEILAND                2,201,129
TILING
Filed Aug. 26, 1938                2 Sheets-Sheet 1
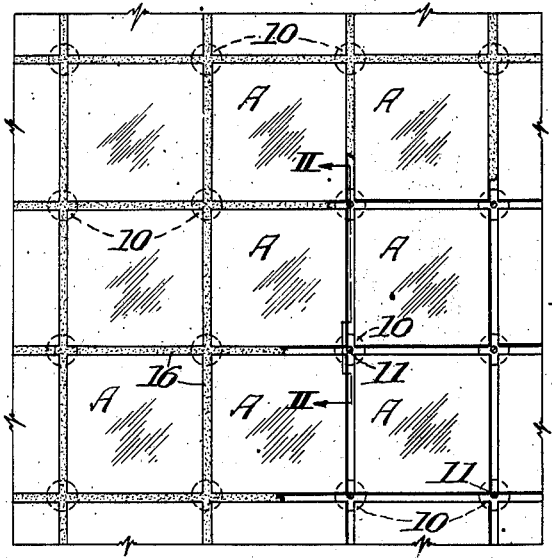
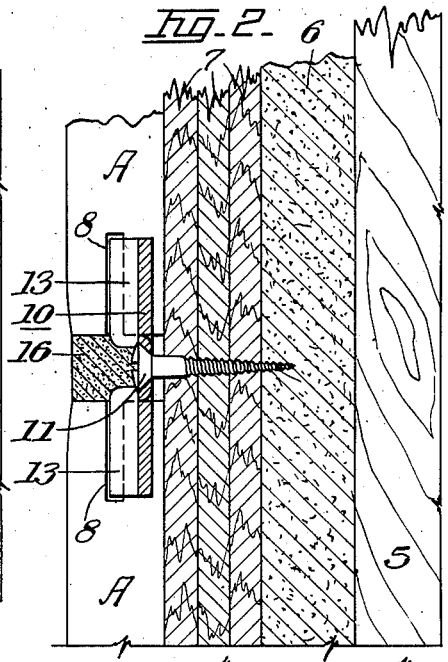
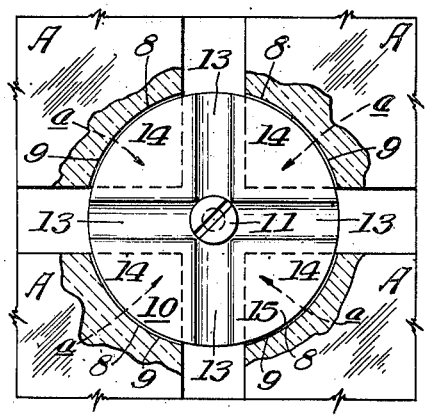
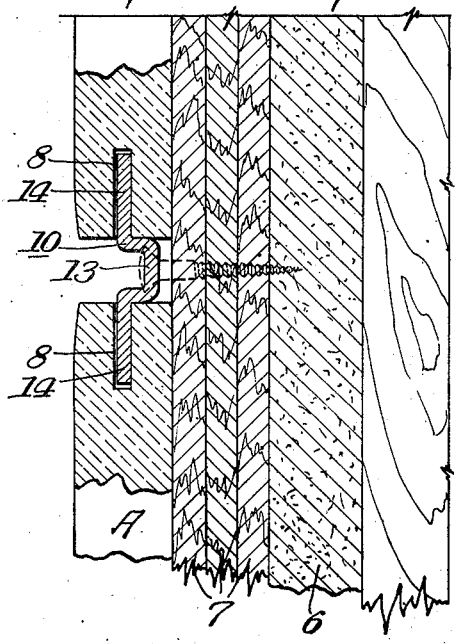
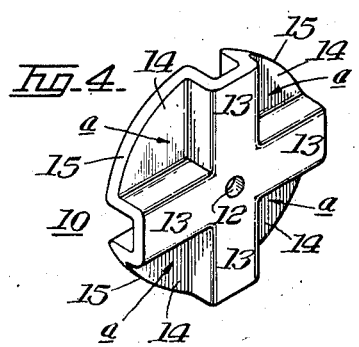
INVENTOR.
Joseph Weiland
BY Clarke & Doolittle
ATTORNEYS.

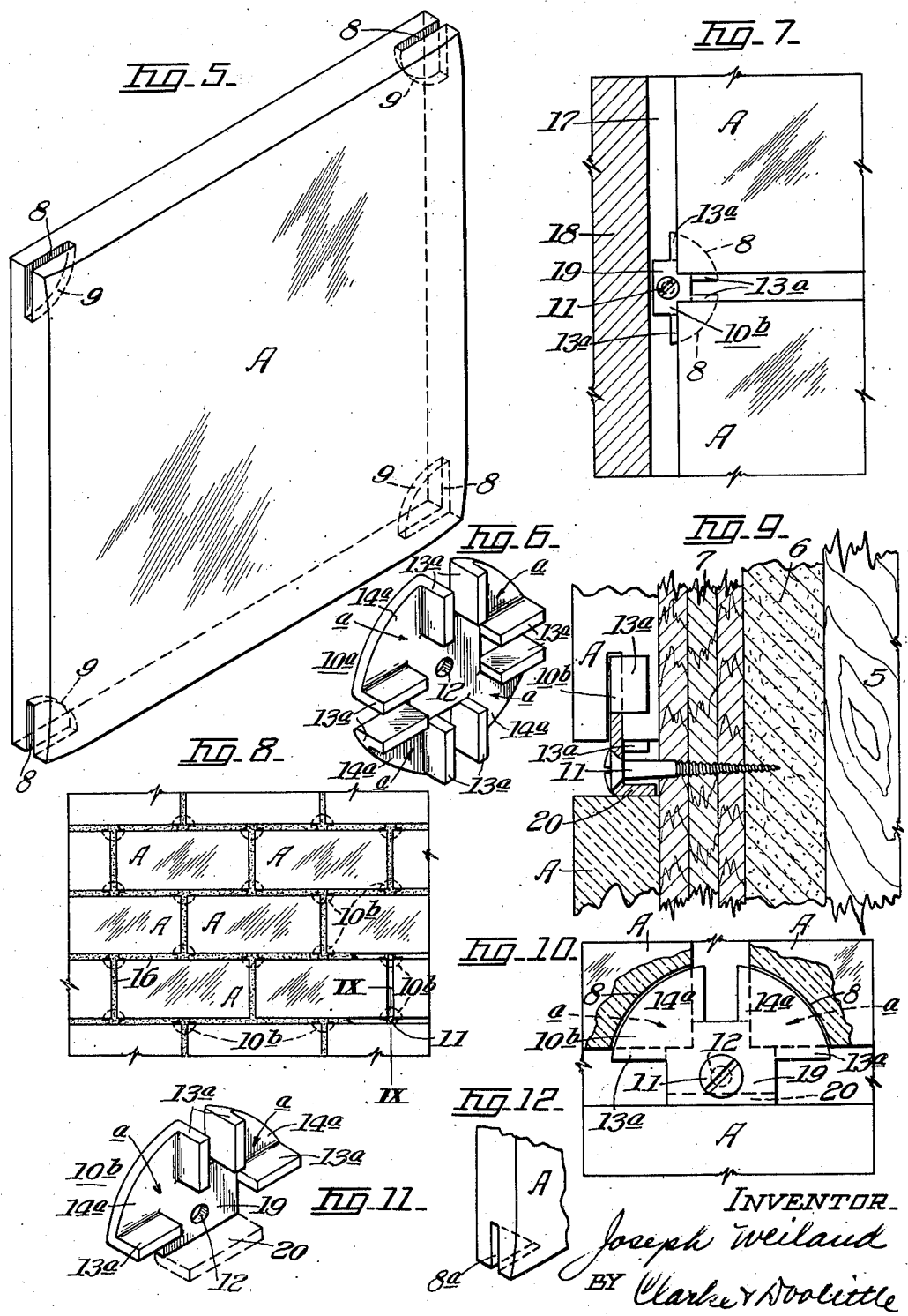

Patented May 14, 1940

2,201,129

UNITED STATES PATENT OFFICE 2,201,129

TILING

Joseph Weiland, Anderson, Ind., assignor, by direct and mesne assignments, to The Butler-Weiland Corporation, Anderson, Ind., a corporation of Indiana Application August 26, 1938, Serial No. 226,892

17 Claims. (Cl. 72—19)

My invention relates to improvements in tiling and the like, and particularly has in view to provide a positive mechanical attachment for ceramic or composition tiles.

Among the objects of the present invention are; to provide a new and improved construction by which the tiling may be secured and maintained in place on the surface of a structure without the use of cement; a construction in which I am enabled to employ simple and efficient tile-attaching means of a character that when the tiles are applied, the attaching means are concealed, while at the same time providing a safe yieldable pressure of the attaching means on the tiling; to provide a construction that may be installed rapidly and inexpensively by skilled or unskilled labor; and to provide simple and efficient tile attaching means capable of use for regular or staggered tiling.

My invention contemplates the mounting and securing of the tiles upon the walls or other receiving surface, whereby the said tiles engage said wall or surface and directly conform thereto. Such construction dispenses with the customary mortar or other spacing between the tiles and surface, thereby preventing an accumulation of dirt, vermin or the like.

The invention may be more readily understood from the following description, taken in connection with the accompanying drawings, wherein:

Fig. 1 is an elevational view of a portion of a wall tiled in the manner of my invention;

Fig. 2, an enlarged sectional view taken on the line II—II of Fig. 1;

Fig. 3, an enlarged elevational view of a portion of Fig. 1, with the tiles broken away to illustrate the attaching means;

Fig. 4, a rear perspective view of the attaching means;

Fig. 5, a perspective view of a tile formed in the manner of my invention;

Fig. 6, a rear perspective view of a modified form of attaching means;

Fig. 7, an elevational view illustrating an application of my invention at a wall corner, doorway or the like;

Fig. 8, a view similar to Fig. 1, illustrating the invention applied to a staggered or broken joint pattern of tiling;

Fig. 9, an enlarged sectional view taken on the line IX—IX of Fig. 8;

Fig. 10, an enlarged elevational view of a portion of Fig. 8, partly broken away;

Fig. 11, a rear perspective view of the modified form of attaching member of Figs. 8 to 10 inclusive; and Fig. 12, a fragmentary perspective view, showing a modified form of tile.

Referring to the drawings, I have illustrated my invention as applied to a pre-formed plaster wall, including the usual studding 5 and plaster or plaster board 6 thereon, as particularly shown in Figs. 2 and 9. Over the plaster 6, I prefer to erect a base member or sheeting 7 of plywood or the like, the same being secured to the plaster and studding in any suitable manner. It will be apparent that the base member 7 may likewise be applied directly to the studding, as when the tiling is being applied to a new wall or building construction.

Base member or sheeting 7 provides a receiving surface for the tiles A, which latter may be of any suitable material, such as the various types of ceramic tiles, composition tiles, or the like. The present invention is of prime importance in connection with ceramic tiles, such as clay and glass tiles, the application of which has heretofore been highly expensive.

In the practice of my invention, the tiles A are slotted at their corner portions only, which slots 8 extend diagonally through the corner portions substantially midway between the planes of the front and rear faces of the tiles. While the slots 8 may be molded in certain types of tiles, it is believed preferable to cut the same in pre-formed clay and glass tiles as by means of small circular cutting wheels or saws of well known construction and operation.

In so slotting the tiles A, it will be apparent that the cutter may be passed diagonally across and through the corner portions of the tiles to form triangular-shaped slots 8a, as shown in Fig. 12. However, I prefer to slot the tiles by moving a circular cutter inwardly from the extreme corner of the tile, whereby the terminal wall 9 of each slot 8 is of circular form. In this manner, the slots may have adequate depth inwardly of the tile body for efficient engagement by an attaching means without unduly weakening the tiles, and at the same time may be rapidly and economically formed.

For mounting and securing the tiles A upon the base member or sheeting 7, I provide attaching members, generally designated 10. The members 10 are in the form of perforate plates, preferably of disk form, and are made of metal or other material possessing resiliency. The thickness of the members 10 is such as to readily permit a sliding insertion thereof into the corner slots 8 of the tiles.

An attaching member 10 is employed at each intersection of a horizontal and vertical joint or mortar course when tiling a wall. Thus, in the regular or straight joint design of tiling illustrated in Figs 1, 2 and 3, each attaching member engages a slot 8 of each of the four adjacent tiles defining the intersecting joint, and secures the tiles to the base member 7. Anchoring means such as screws 11 are provided in center apertures 12 of the members 10, and are entered in the base member 7 to draw the assembly toward said base member.

For the purpose of accurately locating and spacing the tiles A, the members 10 are preferably formed with vertically and horizontally disposed means, defining with intervening marginal portions of the attaching plates, a series of sockets or corner pockets $a$ for receiving the corners of the tiles.

Thus, in the form of Figs. 1 to 4, inclusive, the members 10 are provided with four radially extending channel-like portions 13 formed integrally with the plates 10, the said portions 13 extending rearwardly of the members and being located ninety degrees apart. Adjacent portions 13 form with the intervening wing or marginal portions 14 of the members 10, a series of right angled corner-receiving pockets $a$ for positioning and retaining the tiles A, as particularly illustrated in Fig. 3.

The terminal edges 15 of the marginal portions 14 are preferably circular, having radii substantially corresponding to those of the curved inner walls 9 of the slots 8, whereby the marginal portions fit the slots with slight clearance. The framing limitation of the portions 13 of the receiving sockets $a$ on the attaching members, provides an accurate spacing and confining security for the tiles when positioned on the receiving surface or base member 7.

It will be noted that the portions 13 of members 10 do not extend to the rear faces of the tiles A when assembled therewith, as clearly shown in Fig. 2, whereby the holding tension of the screws 11 is directly and adjustably transmitted through the members 10 to the tiles A. In erecting the tiling of my invention upon the base member 7, the entire assembly may be drawn to the receiving surface or member 7 by tightening the anchoring means or screws 11, whereby the tiles conform directly to said surface without an intervening air-space. Hence, in practice, it is only necessary for the workman to initially plumb or true up the base member 7, and the applied tiling will likewise be true and uniform when applied.

By the term "tile," "tiling," etc., as used herein, and in the claims, reference is had to a fairly rigid unit, or units, to be applied to a supporting surface, such units including thin sections of stone, such as Bedford stone, and the like, glass panels, acoustical blocks or tiles of ceramic or fibrous character by way of example only. Broadly speaking, this invention may be said to be directed to anchoring and spacing of veneering elements as above set forth by way of example only, and the means and method of mounting the same as herein described and claimed.

Due to the central location of the screw apertures 12 and screws 11, the screws are readily available for tightening without interference by or with the tiles A being secured. Likewise, the central portions of the attaching members being unsupported in the rear thereof and between tiles, and due to the resiliency of the members 10, an adjustable tension may be applied to the tiles, which is readily controlled through tightening the screws, as with the well known ratchet screw driver. In this manner, the tiles may be uniformly and tightly secured without danger of breakage.

After the tiling has been erected and secured in place as described, mortar may be applied to the open joints as at 16, completely hiding the attaching means, and providing a sealed tile wall of conventional appearance.

Fig. 6 illustrates a modified form of the attaching member 10a, having the tile-receiving sockets $a$ formed by marginal portions 14a and a series of radially disposed rearwardly extended lugs or flanges 13a, formed by cutting and bending portions of the members. The central screw aperture 12 is provided as before.

In securing the tiles of my invention at wall corners, around doorways, etc., it frequently becomes necessary to form a joint 17 exactly at a corner or doorway, as in Fig. 7, the defining right angled wall or door frame being indicated in section at 18. To accomplish this under my invention, it is only necessary to provide attaching members 10b, either by cutting the original members 10 or 10a substantially in half, preferably leaving the center portion 19 intact to retain sufficient strength for the screw aperture 12, or by pre-forming such members.

The attaching members 10b so formed, include a pair of corner-receiving sockets $a$ defined by portions 13 or 13a and marginal portions 14 or 14a, as the case may be. In this manner, a wall may be completed by employing my invention throughout, and without resorting to bedding some of the tiles in mortar, as has been done heretofore.

Members of the character just described, having a single pair of tile-receiving sockets $a$, may likewise be advantageously employed in the assembly of broken joint or staggered tiling, as shown in Figs. 8 to 10 inclusive. In such tiling application, the vertical joints are broken or alternately off-set, so that only two tile corners are adjacent each joint intersection. By employing the members 10b in the manner shown in Fig. 8, it is never-the-less possible to secure each tile by its four corners. In such case, the central portions 19 of the attaching members extend into the horizontal joints or mortar courses, and are secured by screws 11 as before.

As a further modification, I prefer to provide the central portions 19 of the members 10b, with rearwardly extending flanges or abutments 20, which flanges are properly spaced from the sockets $a$ to determine the width of the horizontal joints between the rows or corners of tile, said flanges engaging the edges of a tile A of the next adjacent row or course. In this manner, the tiling may be readily erected in broken joint pattern, by attaching successive horizontal rows, with the flanges 20 defining the joints therebetween. In such case, it is only necessary for the workman to aline the vertical joints, which may be readily done by a plumb line or the like.

From the foregoing it will be noted that with the employment of any or all of the forms illustrated, I contemplate a method of applying the tiling to the receiving surface that includes the successive application of a plurality of tiles in alined and slightly spaced relationship by means of the corner attaching members of a character having a portion exposed between the adjacent tiles and other portion nested in the slotted or relieved corner portions of the tiles; then applying anchoring means between the adjacent tiles and causing the anchoring means to engage the supporting surface rearward of the tiles so that the tiles are positioned in the desired relationship independent of any supporting surface variation.

Various changes and modifications are contemplated within the scope of the following claims.

I claim:

1. The combination with a plurality of tiles adapted to be applied to a receiving surface, of a plurality of attaching members therefor, said tiles having slots extending diagonally through their corner portions only for engagement by said members, and means for adjustably drawing the attaching members and tiles toward the receiving surface, whereby the rear faces of the tiles engage and conform the tiles to said receiving surface.

2. The combination with a plurality of tiles adapted to be applied to a receiving surface, of a plurality of resilient attaching members therefor, said tiles having slots extending diagonally through their corner portions only, the members having marginal portions entered in the tile slots, said attaching members having central portions spaced from the receiving surface and tiles, and means engaging the central portions for adjustably drawing the tiles toward the receiving surface, whereby the rear faces of the tiles engage and conform the tiles to said receiving surface.

3. The combination with a plurality of tiles spaced to provide joints therebetween, of an attaching member positioned at a joint intersection between the tiles, the corner portions only of the tiles at the joint intersection having slots therein, said attaching members being resilient and having marginal portions entered in said tile slots, and means engaging the central resilient portions of the members between the tiles for adjustably drawing the tiles toward and into conforming engagement with a receiving surface.

4. The combination with a plurality of tiles, of an attaching member therefor, said member having angularly related portions forming sockets for receiving the tile corners therein, the tile corners having slots extending diagonally therethrough between the said portions of the attaching member, the latter having marginal portions entered in said tile slots, and means coacting with the attaching member for drawing said tiles toward and into engagement with a receiving surface.

5. The combination with four tiles arranged to provide an intersecting joint therebetween, of an attaching member at said intersection, said member having a plurality of right angularly disposed portions defining sockets for receiving adjacent corners of the tiles therein and having marginal portions in said sockets, the tiles having their said corners formed with slots extending diagonally therethrough and containing the marginal portions of the attaching members, and means for securing the assembled tiles and attaching member to a receiving surface.

6. The combination with a pair of tiles having a joint therebetween, of an attaching member disposed adjacent a corner of each tile, said member having a plurality of right angularly disposed portions defining sockets for receiving said tile corners therein and having marginal portions in said sockets, the tiles having their said corners formed with slots extending diagonally therethrough and containing the marginal portions of the attaching members, the latter having a portion spaced from the sockets for engaging and spacing a third tile from said pair of tiles, and means for securing the assembled tiles and attaching member to a receiving surface.

7. The combination with a structure having a surface, tile members and the like for covering the surface, said tile members having curved slots in adjacent corners only, and attaching means including curved body members having curved margins for entrance into the slots of the tile members, and means for securing the attaching means to the surface.

8. The combination with a structure having a surface, tile members and the like for covering the surface, said tile members and the like having slots in adjacent corners only, and curved yieldable attaching members having tile engaging portions for yieldingly seating the tile members, said members having curved margins entered into the slots of the tiles, and means for securing the attaching members to the said surface.

9. The combination with a structure including a ply wood surface, a tiling for covering the surface, said tiling including tile members having curved slots in adjacent corners only, and tile attaching members having curved margins for entrance into the slots of the tile members, and screws engaging said members and embedded in the ply wood surface.

10. An attaching device adapted for use with corner-slotted tiles and the like, comprising a resilient member having right angularly disposed portions defining tile corner-receiving sockets therebetween, said member having marginal portions extending between said first portions for reception and concealment by corner slots in the side faces of the tiles and the like, and having a fastening-receiving aperture therein, the maximum dimension of the attaching member, normal to the plane of the tiles and the like secured thereby, being less than the thickness of the said tiles and the like.

11. An attaching device for tiling and the like, comprising a disk-like member having off-set portions forming a pair of tile corner-receiving sockets and having marginal portions extending between said first portions in each socket, an independent spacing abutment disposed in spaced relation to said sockets, said member also having a fastening-receiving aperture therein.

12. In combination a plurality of adjacent tiles having adjacent side faces, a supporting surface to be covered thereby, the tile side faces at adjacent corners being slotted or grooved, an attaching member having a wing portion for and seatable in each tile slot or groove, spaced offset portions between adjacent side faces of adjacent tiles and a central portion between offset portions for surface anchorage, and an anchoring member extending through the central portion and into the supporting surface.

13. In combination a plurality of adjacent tiles having adjacent side faces, a supporting surface to be covered thereby, the tile side faces at adjacent corners being slotted or grooved, an attaching member having a wing portion for and seatable in each tile slot or groove, spaced offset portions between adjacent corners of adjacent tiles and a central portion for surface anchorage and exposed between the adjacent corners of the tiles, and means extending through the central portion between the adjacent tile corners and into said surface.

14. In combination a plurality of adjacent tiles having adjacent side faces and arranged for slight spacing therebetween, a supporting surface to be substantially covered thereby, the adjacent corner portions of said tiles being suitably relieved intermediate their front and rear faces, an attaching member having a wing for each adjacent corner and seatable in the relieved portion thereof and a central portion integral with each wing portion, and a single anchor member extending through the central portion for anchoring the attaching member to the receiving surface, said anchor member being substantially coincident with the recess formed between said tiles at the adjacent corners permitting drawing of the tiles toward the surface subsequent to the association of all adjacent tiles at said corner with the anchor member.

15. In combination a plurality of tiles adapted to be applied to a receiving surface in adjacent corner-to-corner relationship, the adjacent tiles being relieved between their front and back faces and at the corners, an attaching member having portions nestable in all of the adjacent relieved portions of adjacent tiles and portions interposed between adjacent side faces of said adjacent tiles for predetermined tile spacing and alignment thereof, and means for securing said attaching member to the receiving surface to secure all of the tiles thereto in aligned and spaced relation and in co-planar relation, the spacing between adjacent corners of adjacent tiles being sufficient to receive and permit the passage of said securing means, said securing means comprising a single element, the attaching member having a tile exposed portion apertured for reception of the securing element.

16. An attaching device adapted for use with corner-slotted tiles and the like comprising a curved yieldable member for attachment to a support, said member having tile engaging portions for yieldingly spacing the adjacent tile members and the like and contiguous connecting portions having curved margins for entrance into confronting slots of the adjacent tile members for concealment and anchorage therein, and a fastening-receiving opening therethrough, the maximum thickness of the member being less than the thickness of the said tiles and the like.

17. An attaching device for corner slotted tiles and the like, comprising a disk-like member having independent flanges struck therefrom of less height than the tile thickness and forming tile corner-receiving sockets therebetween, said member having marginal portions extending between said flanges for reception and concealment by corner slots in the side faces of the tiles and the like, and also having a central fastening-receiving aperture therein.

JOSEPH WEILAND.